Nov. 13, 1928.

J. REECE ET AL 1,691,610

POWER TRANSMISSION

Filed Nov. 27, 1923

John Reece &
F.A. Reece
Inventors,
by Rogers, Kennedy & Campbell
Attorneys.

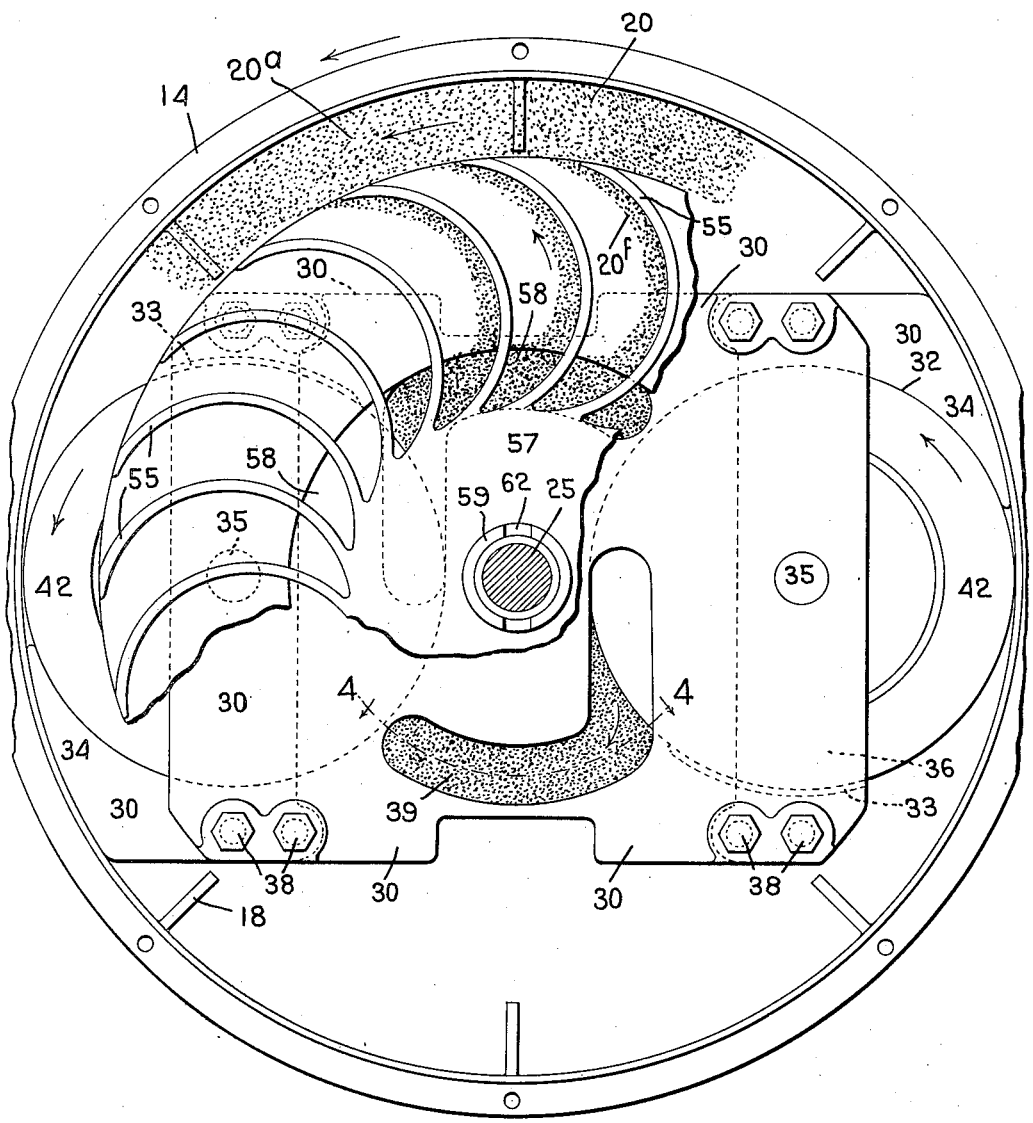

Patented Nov. 13, 1928.

1,691,610

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed November 27, 1923. Serial No. 677,281.

This invention relates to power transmission, and involves a novel method and apparatus adapted for the transmission of power for various purposes and in various situations, especially where the load or speed is variable, for example, as with motor vehicles.

In common with prior applications the general object hereof is to enable changes of speed ratio between the driving member or shaft and the driven member or shaft, not by any step by step adjustment, but by gradual or continuous changes through all intermediate ratios, and preferably from unity ratio down to zero speed of the driven shaft. Moreover the general plan is to secure a readjustment of the speed or ratio to correspond to the conditions or load in a self acting manner, without the manipulations of the usual clutch and gear shift, or other attention by the operator. Thus, for example, in the driving of a vehicle on changing road conditions the invention operates to cause the speed ratio and torque to accommodate themselves so as to give the most effective results; whereby with any given conditions of resistance or load on the driven parts the maximum driven speed thereof will be attained which is consistent with the conditions of speed and power in the engine at the time, as determined by the throttle or otherwise. If the vehicle should encounter an increase of grade, this increases the load on the driven shaft, thus slowing down the vehicle and the shaft; and this invention utilizes this slowing down, and the consequent increase of speed difference in the driving and driven members, to effect an alteration in the transmitting action such that the required increased torque is delivered, and without the need of attention by the operator. A great range of speed ratio and torque is permitted. When the torque equals the load the driven shaft will be rotated at the full speed of the driving shaft, or with a speed ratio of one to one, under which conditions the entire mechanism may rotate as a unit and there will be no play or internal motion of the parts of the transmission and consequently no wear. On the other hand, with increase of load, the ratio may decrease toward or substantially to zero. Control by the engine throttle is additional or supplemental to the self control of the transmission, and by manipulating the throttle the operator can at will increase or decrease the developed power, and speed up or slow down the engine and therefore the driven shaft, this being the only attention required for driving the vehicle under varying conditions.

With the present invention, viewed in one light, the principles of operation comprise the maintaining of a body of liquid traveling around with the driving member or shaft, or caused to travel around, in a normal or annular path, by the action of the driving member, and diverting portions of such liquid by guiding the same in a suitable channel or path on the driven member, such that the liquid which is received is diverted or changed in its path and again discharged from the driven member, with the result that, through the liquid, a forward thrust is delivered to the driven member; these actions preferably being continuous, and the discharged liquid being returned in an effective manner into the original body of liquid. In the described embodiment of the invention this transmitting action, namely by the thrust created in the driven member by the diversion and discharge of the liquid, operates as long as the driven shaft is turning slower than the driving shaft or is stationary; and at all times when the driven shaft is in rotation this transmitting effect is supplemented or enhanced by a centrifugal action about the main axis, caused by said rotation, and this centrifugal action or force is used to effect centrifugal action upon the driven shaft. As the driven torque upon the driven shaft. As the driven shaft speed becomes slower and slower relatively to that of the driving shaft this centrifugal transmitting action decreases, while at the same time the forward thrusting action of the diverted liquid increases, to the point where it is at a maximum when the driven shaft actually is stationary, the centrifugal action then being zero. By the combination of these two forces an effective transmission of torque is constantly maintained, and in a manner to attain the general objects heretofore recited.

The further and more detail features and principles of the present invention will be hereinafter explained more fully in connection with the specific embodiment to be described for the purposes of illustration of such principles. In addition to the objects and advantages above referred to other objects and advantages will be elucidated in the following description or will be apparent to those skilled in the art.

In the accompanying drawings Fig. 1 is substantially a central longitudinal section view of one form or embodiment of a transmission apparatus embodying the principles of the present invention, the lower half constituting a front elevation and section, and the upper half constituting a plan view and section, both taken on the crooked line 1—1 of Fig. 2, as indicated by the arrows.

Fig. 3 is a right elevation and section similar to Fig. 2, but taken on the crooked line 3—3 of Fig. 1.

Fig. 4 is a development of a detail, taken in section on the curved line 4—4 of Fig. 3.

Figure 1:
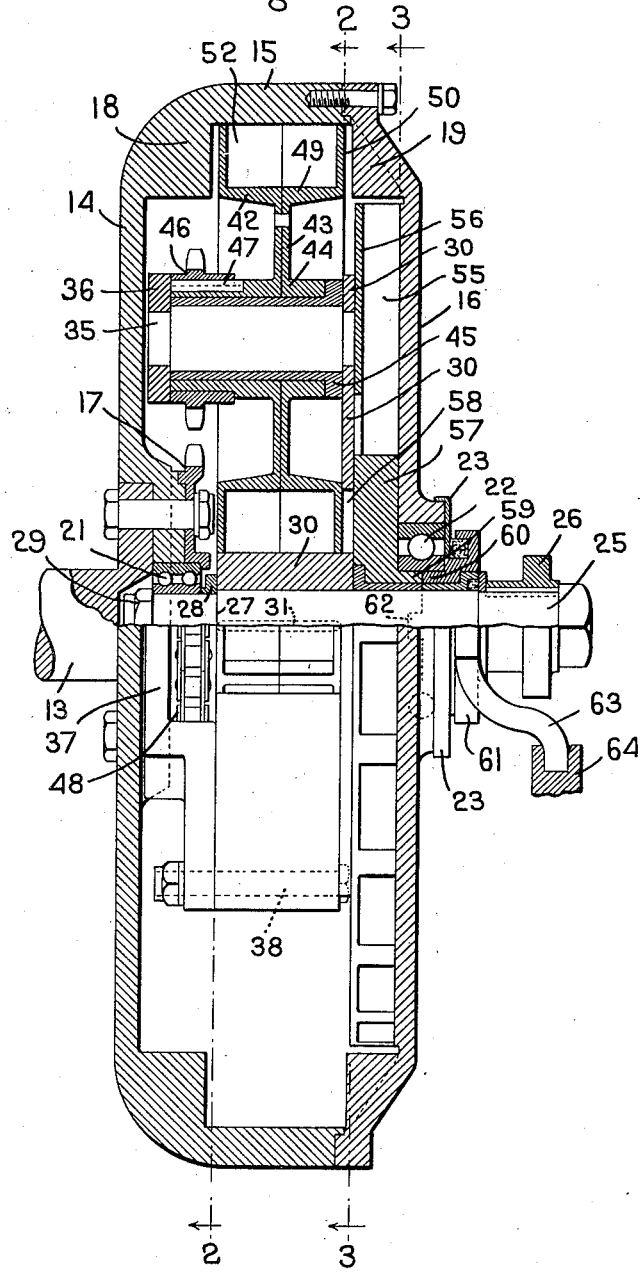

The mechanical elements will first be described and subsequently the method of transmission and mode of operation involved.

The driving member 13 may be the crank shaft of an internal combustion engine such as is chiefly used on motor vehicles. Attached to the shaft is shown a disk or wheel 14 which, with connected and supported elements, may be considered as the fly wheel, affording the steadying effect required by such type of engine. The fly wheel comprises the disk portion 14, the rim 15 and the cover plate 16, thus affording a hollow structure containing the mechanism to be described. Bolted to the engine shaft and to the fly wheel is a sprocket wheel 17, from which connections extend to the driven parts as will be described. The inner periphery of the fly wheel is provided with a series of vanes 18 and 19, the former located at the corner between the disk 14 and the rim 15, the latter in the corner between disk 16 and rim 15. These are for the purpose of maintaining a body of liquid 20 in forward travel or annular flow. By the word liquid it is intended to cover any flowing material such as mercury or oil or metal spheres or a combination of these. It will be understood that the high speed of the driving parts and fly wheel compel the liquid to remain in a circumferential position, forming a substantially concentric or annular body, moved forwardly at high speed through the vanes 18 and 19, and constituting a mobile source of power, drawn upon for the described transmitting actions, and returned to the liquid body after discharge.

Within the fly wheel, adjacent the engine shaft, and between it and the driven shaft, is shown a ball bearing 21, and a similar ball bearing 22 is shown at the other side between the fly wheel cover plate and certain fixed parts. To prevent loss of oil from the bearing 22 is shown a flanged cover or cap 23. The elements thus far described turn rigidly together and may be considered as the driving member of the apparatus.

The driven parts comprise, in the first place, the driven member or shaft 25, which it is desired shall rotate at varying speed ratios in relation to the driving member or engine shaft. The right extremity of the driven shaft is shown provided with a part 26 which may constitute a portion of the usual universal connection to a further transmitting shaft. The driven shaft near its left end is formed with a shoulder 27 against which bears a washer 28, this serving properly to space the shaft and bearing 21, and a nut 29 holding these parts in this arrangement.

A specially constructed casting, block or element 30, secured by key 31 to the driven shaft, serves to carry the rotating members or rotors 42 to be described, the carrier 30 being formed with a curved recess wall 32 to accommodate each of the rotors, this recess being enlarged at the discharge side, forming a clearance 33 to supplement the discharging action. The extreme outer portion of the carrier 30 is arranged to provide a blade or edge 34 adapted to enter the annular stream of liquid, acting like a scoop and diverting the liquid from the stream, preferably in an inward direction. Indeed the curved surface formed by the recessed carrier and its scoop portion or forward edge 34 constitute the guide means heretofore referred to, provided on the driven member, adapted to receive, divert and discharge liquid, thereby imposing forward thrust on the driven member, due to the high inertia force in the liquid, which causes it to travel rapidly around the curved path to an opposite discharge point as will be described.

Figure 2:
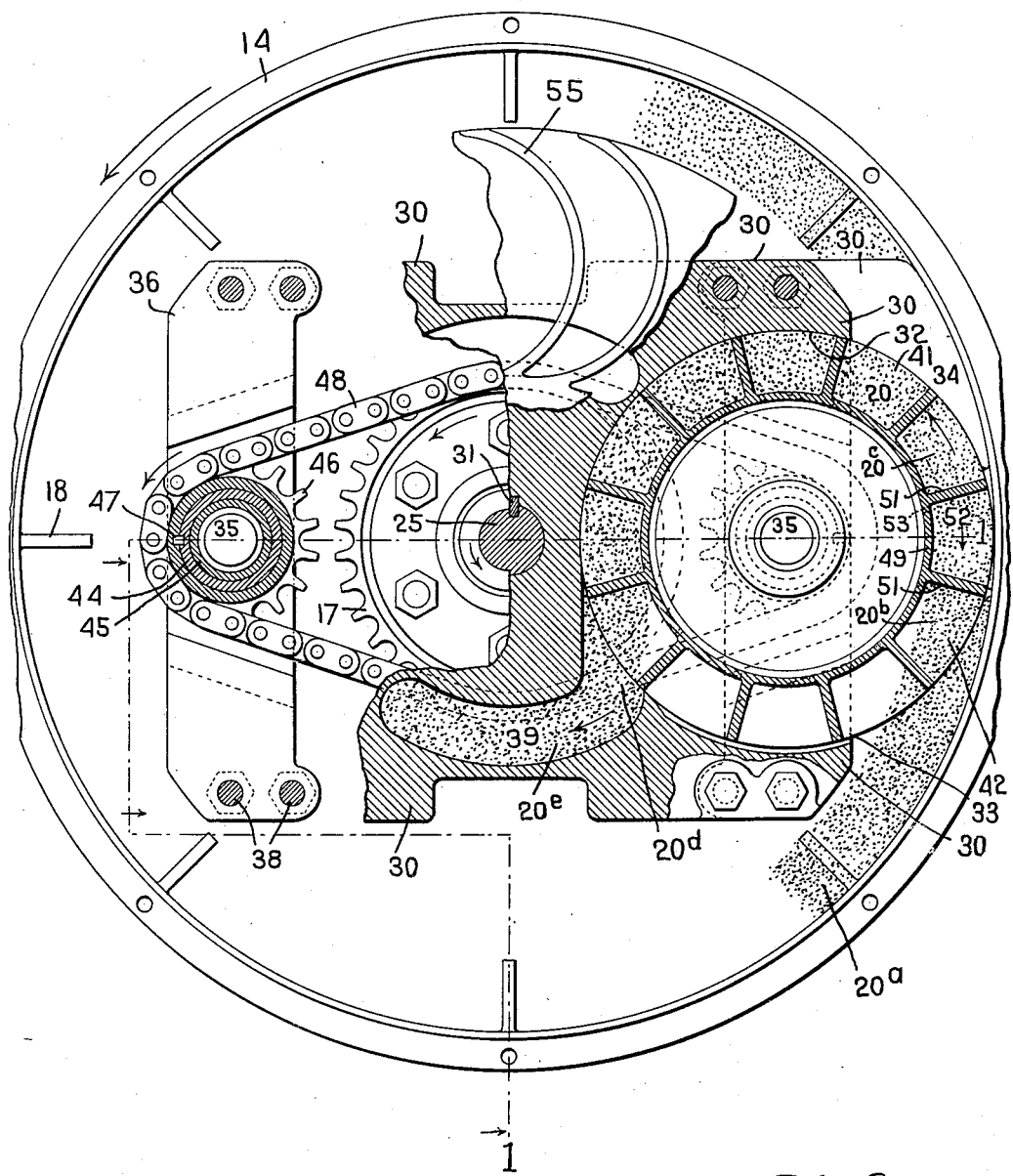
Fig. 2 is a right hand elevation and vertical section taken at different planes, as indicated by the crooked line 2—2 of Fig. 1.

To complete the description of the structure of the parts carried with the driven shaft, the carrier or block 30 is provided, at each side, with a stud 35, arranged to support one of the rotors. The studs, when assembled in place, are held at their opposite or left ends by bridge members or cross bars 36, each having an offset middle part 37, as seen in Figs. 1 and 2, to receive the sprocket pinion to be described. Bolts 38 hold the bridge pieces in place.

Each of the circular recesses in the carrier block, near its inner position, opens into a special discharge slot or passage 39, formed in the block and having an inclined surface 40, as indicated in Fig. 4, so that the discharged liquid is forced laterally, that is axially, out of the plane of the rotor, for the purpose of discharge and return to the body of liquid in a manner to be described. This completes the description of the driven shaft and parts carried rigidly by it.

The diverting channel heretofore mentioned, carried on the driven parts, is here shown as the curved space within the carrier recess wall 32, 34, and between such wall and the rotors 42. Two such rotors 42 are shown, each consisting of symmetrical halves riveted together. Each rotor has a web 43 connecting with a hub 44, inside of which is a sleeve or bushing 45 surrounding the stud 35.

Except when the driving and driven shafts are turning at the same speed the rotors will be in rotation about their studs. For this purpose each rotor has attached to it a sprocket pinion 46 connected to the hub 44 by a key 47. A sprocket chain 48 interconnects both sprocket pinions 46 and the driving sprocket wheel 17. This operating connection forms an important element in part of the actions to be described.

Each rotor is provided with a cylindrical wall 49 facing the recess wall 32 in the carrier block, and with that wall forming the channel or guide 41 by which the rushing liquid, diverted inwardly, is guided around through a changing path to a discharge substantially in a reverse direction at the inner end of the channel. Such channel is bounded laterally by annular walls 50 extending outwardly from the cylindrical wall at the two sides of each rotor.

In order that the rotors may take part in the centrifugal transmitting action referred to each of them is shown provided with vanes or paddles 51 between the walls 49 and 50, forming a succession of pockets 52, which temporarily divide the traveling liquid into successive portions or sections as they travel inwardly from the annular flow to the discharge passage 39. Each pocket 52 may be provided with a small air hole 53 to avoid any obstructing effect from pocketed air.

It only remains to describe certain guides or members arranged to receive the liquid discharged from the driven shaft channels and to return the same effectively to the body of liquid. These parts are relatively stationary and preferably actually stationary. They comprise a series of curved guide plates 55. Each is curved in such a manner as to receive liquid discharged through inclined pasage 39 and to guide the liquid in the curved path and deliver it outwardly substantially tangentially and forwardly into the flowing annular body of liquid, as will be clear from Fig. 3. These fixed return guides are placed to one side of the carrier block and rotors, as best seen in Fig. 1. They are inter-connected by an annular web 56. Curved channels are formed between this web, the curved guides, and the fly wheel cover plate 16. The annular connecting plate 56 extends inwardly only part way. The guides 55 at their inner ends are interconnected by a disk or web 57. Between the webs 56 and 57 are spaces or openings 58 by which the liquid, discharged laterally from the inclined passage 39, enters the curved channels between the fixed guides 55. The inertia of the liquid carries it along these channels, which discharge it in a forward direction into the body of liquid 20 as described.

In order to hold the curved guides 55 and the webs 56 and 57 stationary the following fittings may be employed. The web 57 is formed with a hub or foot 59 which extends underneath the ball bearings 22. Adjacent to this hub 59 is the hub 60 of an exterior or stationary member 61. The two hubs are locked together by a tongue and notch device 62. The guides 55 are thereby rendered substantially rigid with the exterior member 61. This member 61 is formed with an extension or arm 63 which is anchored by means of any fixed portion or member 64.

The liquid 20 in its different positions may be identified as follows. In its normal condition the liquid body takes the annular condition $20^a$. As the vanes 51 enter the liquid the liquid enters the pockets 52 as indicated at $20^b$. Passing the edge or scoop 34 the liquid is diverted from the main body inwardly at $20^c$, passing around the curved channel 41 between the rotor and the carrier recess. At the opposite or inner side the liquid leaves this channel at $20^d$ and then is shifted laterally at $20^e$ in the inclined channel 39. Leaving this passage and passing through the openings 58 the liquid at $20^f$ travels finally around the fixed guides 55, the discharge of which redelivers the liquid into the original annular body $20^a$.

The operation has been indicated but may be supplementally explained as follows. The driven shaft and attached members will first be considered as held stationary, and in Figs. 2 and 3 the conditions are shown when such is the case. When the driven shaft is stationary and the engine shaft is turning the fly-wheel rotation will cause the liquid to take its normal annular condition as shown. Until sufficient torque is delivered to cause the starting of the driven parts into rotation conditions will exist as shown on Figs. 2 and 3. The rotors 42 will not planetate. They will rotate on their studs 35, but will not revolve around the main axis, as they are carried on the carrier 30 which is secured to the driven shaft. The liquid $20^a$ whirling around in an annular body or stream, confined closely to the periphery of the fly wheel by centrifugal force, and impelled by the vanes 18 and 19, constitutes the active power transmitting element between the driving parts and the parts carried by the driven shaft. The rotors, and the rotor carrier, are of less thickness than the fly wheel cavity, so that the annular body of liquid comprises portions at the extreme sides, impelled by the vanes 18 and 19 respectively, and a middle portion, which cooperates with the deflectors and rotors, these being arranged between the driving vanes as clearly seen in Fig. 1. Therefore the middle portion of the whirling liquid is continuously scooped inward or diverted from the annular stream into the channel or guide 41 formed by the recess 32 in the carrier or block 30. The liquid races around, guided between the rotor walls and the carrier wall. This curved or circular form of channel gives a smooth flow of the liquid and at the same time reverses its relative direction, the liquid entering the channel with forward movement and leaving it with relatively reverse movement. With the driven parts stationary this action delivers the maximum forward pressure upon the channel walls, producing a powerful torque on the driven shaft. This well known principle of hydraulics requires no detail description; the present application of this principle, for power transmitting purposes, is considered to be absolutely novel. After traversing the curved channel, which changes its direction of flow, producing torque as described, the liquid passes out of the channel at $20^d$ and its inertia carries it around through the inclined passage 39, acquiring therein a lateral displacement. This motion is concentric and the path is smooth, so that no undue actions result. Indeed there will be a reaction at the turn where the liquid $20^d$ passes from the rotor into the concentric passage, but the only reaction at this point will be a tendency to thrust in a forward direction upon the carrier 30, thereby transmitting power to the driven shaft. From the inclined concentric passage 39 the liquid passes laterally through the openings 58 between the fixed return guide members 55. The curved shape of these serves to divert the liquid travel into a forward direction, the liquid being discharged from between these guides into the main body of liquid $20^a$. With the driven shaft stationary the liquid may be thus discharged into the original body at substantially the original speed.

Different conditions arise when the driven shaft starts into rotation. Assuming a speed ratio of two to one the actions may be substantially as follows. The driven shaft and the carrier 30 are turning forwardly at half the speed of the fly wheel. The rotors are now planetating, having a substantial speed of revolution but a reduced speed of rotation. The whirling liquid $20^a$ is diverted into the guiding channel at a relatively slower speed than before. The speed of the racing liquid through the guiding channel will be thus reduced and the delivered torque will be correspondingly reduced. The liquid discharged through the passage 39 and the fixed guides 55 will be at slower speed and the fly wheel will have the task of speeding this material up to the full speed, thus requiring additional energy. Until the driven shaft started into rotation the rotor vanes 51 served no function. As soon however as planetation of the rotors commenced then the portions of liquid in the pockets 52 between the rotor vanes became subject to centrifugal force due to the revolution about the main axis. Such centrifugal force is zero when the driven shaft is held stationary and becomes the operating force when the driven shaft turns at the engine speed. At two to one ratio the centrifugal force is at an intermediate value. Its effect is a retarding action upon the rotation of the rotors on their studs. This retarding action becomes greater and greater with increased driven shaft speed, since centrifugal force increases with the square of the speed. If the vanes were omitted, and without any retarding action, the effect of the sprocket connection from the driving shaft to the rotors would be to turn them in a forward direction, the same as the fly wheel, counter-clockwise in Figs. 2 and 3. The retarding action of centrifugal force operates, therefore, through the sprocket chain to drive forwardly the rotor studs, and other driven parts, relatively to the driving shaft and sprocket. Thus a material transmitting or driving action is effected by the centrifugal force. As the liquid-pressure transmission decreases, with the relative increase of speed of the driven parts, the centrifugal transmitting action increases. Thus through all ratios, when the driven shaft is in actual rotation, these two transmitting actions cooperate, the centrifugal action approaching maximum, and the other approaching zero, as the driven shaft speed approaches that of the driving shaft, when permitted by the conditions of load.

When the conditions are such that the load can be overcome without speed reduction, the driven shaft turning at the same speed as the driving shaft, all interior motions cease. Planetation ceases because the rotors no longer turn on their studs. The pockets of the rotors, however, from the deflector 34 around to the discharge, are full of liquid under high centrifugal force. The outward pressure of this liquid tends powerfully to rotate the rotors clockwise. Under the conditions assumed this force, and the torque produced by it, just counterbalance the load or resistance on the driven parts. A static condition is produced in which the forces are balanced and the entire mechanism rotates as a unitary device, without internal play; so that when driving a vehicle under ordinary conditions there is no wear and tear upon the parts.

The following supplemental explanations will assist in understanding the appended claims and the scope of the invention. The member or block 30 has been described as a carrier for the rotors and as formed with a recess wall 32, constituting a guide or channel for the liquid. The affording of the channel may be considered the main function of the member 30, the action of the rotors being supplemental, and it may therefore be termed a channel member or block, carried on the driven shaft, and comprising the deflector or diverting edge 34 which scoops the liquid in from the annular body of liquid, and the curved recess wall 32 which changes the direction of flow, diverting the liquid in a preferably curved manner and into a relatively reversed direction. These actions produce the liquid-thrust transmitting effect. The centrifugal transmitting effect is produced through the rotors, or other movable devices, carried around on the channel block 30, and engaging with the diverted liquid, the rotors being normally actuated by the sprocket or other connections from the driving shaft, and the centrifugal force operating to retard this actuation, thereby tending to speed up the driven shaft to that of the driving shaft. The liquid thrust action has been stated to be produced in a channel in the member 30, the channel changing or reversing the direction of flow. This curved channel might extend in any plane, for example, laterally from the point of deflection, but is shown as extending in an inward direction in a plane at right angles to the main axis. An advantage of this is that the inward flow of liquid from the deflecting point may be utilized for both the liquid thrust and the centrifugal driving actions. If the deflecting and forward liquid thrust action was in a channel standing laterally then this chanel would have to be subsequently turned inwardly so as to secure the centrifugal transmitting action, centrifugal force opposing the inward flow. In other words the two actions would be successive with any particle of liquid; but as stated it is preferred to divert the liquid in a curved inward path and utilize the same for both of the transmitting actions simultaneously. At half speed or other intermediate speed the transmission is effected by a combination of the liquid thrust action and the centrifugal action, and the former action increases as the driven shaft speed decreases, while the latter action increases as the driven shaft speed increases.

It will thus be seen that a power transmission method and apparatus have been described embodying the principles of this invention and attaining the objects mentioned. Since many matters of combination, arrangement, structure, form and detail may be variously modified without departing from the underlying principles, it is not intended to limit the invention to such matters except so far as specified in the appended claims.

What is claimed is:

1. Power transmission apparatus comprising the rotary driving and driven members, in combination with a hollow casing revolved by the driving member, an annular stream of liquid held peripherally in said casing by centrifugal force and traveling around therewith, and a diverting part (34) on the driven member within said casing having a portion extended into the annular stream of liquid continuously to divert liquid therefrom, the driven member formed with a channel of recurved shape to guide such diverted liquid in a reverse path to cause continuous driving thrust on the driven member, and a discharge passage leading therefrom, and the driving member formed with a passage receiving the liquid discharged from said discharge passage and redelivering it to the annular stream of liquid.

2. Power transmission apparatus, comprising a rotary driving member and a rotary driven member, an inertia element intermediate said members, means on the driving member giving said element a whirling velocity, and engaging means on the driven member constructed with an inwardly recurved surface to receive and divert the element and thus receive a forward thrust due to the velocity of the element.

3. Power transmission apparatus comprising the rotary driving and driven members, in combination with a hollow casing surrounding the driving member, a body of liquid normally whirling around in a continuous annular stream within said casing, propelling means revolved by the driving member for causing such whirling motion of the liquid stream, and a deflecting and guiding means on the driven member arranged to divert liquid continuously from the annular liquid and guide it in a reversely curved path such that the diverted liquid effects continuous forward thrust on the driven member.

4. Apparatus as in claim 3 and wherein the hollow casing is mounted to turn with the driving shaft and contains the propelling means and carries the annular liquid stream forward at driving speed.

5. Apparatus as in claim 3 and wherein the propelling means comprises blades revolved by the driving member operating to maintain the liquid in constant travel as an annular stream while centrifugal force holds the liquid peripherally in the casing, and the deflecting and guiding means being arranged within the casing laterally adjacent the blades.

6. Apparatus as in claim 3 and wherein the deflecting and guiding means is located in position with its edge dipping into the annular liquid stream in the casing so as to engage and continuously divert a portion of the liquid, and said guiding means arranged to restore the same to the annular liquid.

7. Power transmission apparatus comprising the rotary driving and driven members, in combination with a hollow casing surrounding the driving member, a body of liquid normally whirling around in an annular stream within said casing, propelling means revolved by the driving member for causing such whirling motion of the liquid stream, and a deflecting means on the driven member arranged to divert a portion of the whirling liquid continuously from the annular stream, and a channel guiding the diverted liquid inwardly in a changing path such that the liquid effects forward thrust on the driven member.

8. Apparatus as in claim 7 and wherein the liquid guiding channel is of a shape turning backward in a reverse direction and discharging inwardly.

9. Apparatus as in claim 7 and wherein the liquid guiding channel is of a shape turning backward in a reverse direction and discharging inwardly and laterally at a slant, to return to the annular liquid.

10. Apparatus as in claim 7 and wherein are fixed blades receiving the liquid discharged from the channel and arranged to redeliver the same in forward direction to the annular liquid.

11. Apparatus as in claim 7 and wherein is a slanted passage conducting laterally the liquid from such channel, and means arranged to receive such liquid and redeliver it to the annular liquid.

12. Power transmission apparatus comprising the rotary driving and driven members, in combination with a body of liquid normally whirling around in an annular condition, propelling means revolved by the driving member for causing such whirling of the liquid, an exterior casing wall confining the whirling liquid, means on the driven member arranged to divert liquid inwardly continuously from the annular liquid and guide it in a reversely curved path, said diverting and guiding means comprising a curved wall and a rotor within and spaced from such wall.

13. Apparatus as in claim 12 and wherein the rotor is journalled on the driven member between the axis and the annular liquid.

14. Apparatus as in claim 12 and wherein the rotor is journalled on the driven member between the axis and the annular liquid and is provided with the liquid engaging vanes.

15. Apparatus as in claim 12 and wherein the rotor is journalled in planetating position on the driven member with connections for rotating it from the driving member when the driving and driven members are running at different speeds.

16. Power transmission apparatus comprising the rotary driving and driven members, in combination with a body of liquid normally whirling around in an annular condition, propelling means revolved by the driving member for causing such whirling of the liquid, means including a vaned rotor planetable on the driven member for deflecting liquid from the annular body thereof and guiding it inwardly in a curved path and discharging it, whereby liquid thrust upon the driven member is effected, and connections whereby said rotor is actuated by reason of the speed difference between the driving and driven members, whereby centrifugal action on the inwardly traveling liquid tends to retard the rotor and therefore to thrust the driven member in the same direction with such liquid thrust.

17. Apparatus as in claim 16 and wherein the rotor is a pocket wheel, with connections comprising gearing from the driving member, arranged to rotate the rotor in the same direction as the driving member.

18. Apparatus as in claim 16 and wherein the means for guiding inwardly the liquid in a curved path comprises a channel formed between the rotor and a guide wall on the driven member, such wall having a deflecting edge entering the whirling liquid body.

19. Apparatus as in claim 16 and wherein the means for guiding inwardly the liquid in a curved path comprises a channel formed between the rotor and a guide wall on the driven member, such wall having a deflecting edge entering the whirling liquid body, and the rotor consisting of a wheel having vanes extending across such channel and dividing the inwardly racing liquid into sections each subject to centrifugal force and acting against such vanes to retard the planetation of the rotor.

20. Apparatus as in claim 16 and wherein when the driven member speed is zero and the rotor remains in one position the power transmission is solely by liquid thrust only and the centrifugal action is zero.

21. Apparatus as in claim 16 and wherein when the driven and driving members are rotating at the same speed the rotor does not rotate and the power transmission is solely through centrifugal force on the liquid engaged with the rotor, balancing the drag on the driven member.

22. Power transmission apparatus comprising a driving member, a flowing mass, a driven member, means revolved by the driving member enclosing the mass and causing it to whirl around an annular path, an actuable device carried by the driven member arranged to take up portions of whirling mass and divert the same from such annular path, and means actuating said device.

23. Power transmission apparatus comprising a driving member, a driven member, mass portions, means revolved by the driving member causing the mass portions to whirl around an annular path, an actuable device carried by the driven member arranged to take up portions of whirling mass and divert the same in an inward direction, and means actuating said device; whereby the diverting of mass portions imposes by reaction a forward thrust on the driven members, and whereby the centrifugal force of the mass portions resisting their inward diversion imposes a pressure on the actuable device and thereby a forward thrust on the driven member.

JOHN REECE.
FRANKLIN A. REECE.